(12) United States Patent
Jin et al.

(10) Patent No.: US 7,409,105 B2
(45) Date of Patent: Aug. 5, 2008

(54) PANORAMIC MAKER ENGINE FOR A LOW PROFILE SYSTEM

(75) Inventors: Yiqing Jin, Hangzhou (CN); Yushan Huang, Hangzhou (CN); Donghui Wu, Fremont, CA (US); Lingxiang Zhou, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 623 days.

(21) Appl. No.: 10/692,446

(22) Filed: Oct. 22, 2003

(65) Prior Publication Data

US 2005/0089244 A1    Apr. 28, 2005

(51) Int. Cl.
*G06K 9/36* (2006.01)

(52) U.S. Cl. .................... 382/284; 382/296; 382/297

(58) Field of Classification Search ................ 382/284, 382/297, 296
See application file for complete search history.

(56) References Cited

U.S. PATENT DOCUMENTS

| | | | |
|---|---|---|---|
| 4,090,174 A * | 5/1978 | Van Voorhis | 382/304 |
| 5,450,604 A * | 9/1995 | Davies | 712/22 |
| 5,742,710 A | 4/1998 | Hsu et al. | 382/236 |
| 5,790,206 A | 8/1998 | Ju | |
| 5,987,164 A | 11/1999 | Szeliski et al. | |
| 6,078,701 A | 6/2000 | Hsu et al. | 382/294 |
| 6,097,854 A * | 8/2000 | Szeliski et al. | 382/284 |
| 6,128,108 A | 10/2000 | Teo | |
| 6,157,747 A * | 12/2000 | Szeliski et al. | 382/284 |
| 6,192,156 B1 | 2/2001 | Moorby | 382/236 |
| 6,359,617 B1 | 3/2002 | Xiong | |
| 6,385,349 B1 * | 5/2002 | Teo | 382/284 |
| 6,393,162 B1 * | 5/2002 | Higurashi | 382/284 |
| 6,456,323 B1 | 9/2002 | Mancuso et al. | |
| 6,532,037 B1 | 3/2003 | Shimura | |
| 6,646,655 B1 | 11/2003 | Brandt et al. | |
| 6,978,051 B2 * | 12/2005 | Edwards | 382/284 |

(Continued)

FOREIGN PATENT DOCUMENTS

WO    WO-03/091948 A1    11/2003

OTHER PUBLICATIONS

Yalin Xiong et al, "Registration, Calibration and Blending in Creating High Quality Panoramas," Applications of Computer Vision, 1998. WACV '98 Proceedings, Fourth IEEE Workshop On Princeton, NJ Oct. 19-21, 1998, Los Alamitos, CA, USA, IEEE Comput. Soc., Oct. 19, 1998, pp. 69-74.

(Continued)

*Primary Examiner*—Samir Ahmed
*Assistant Examiner*—Claire X. Wang
(74) *Attorney, Agent, or Firm*—Patent Law Group LLP; David C. Hsia

(57) ABSTRACT

A method for generating a panoramic image includes receiving a first image, dividing the first image into a first portion and a second portion, rotating the first portion of the first image, saving the rotated first portion of the first image in a nonvolatile memory, receiving a second image, dividing the second image into a third portion and a fourth portion, matching an overlapping region between the second portion of the first image and the third portion of the second image, stitching the second portion of the first image and the third portion of the second image to form a first stitched image, rotating the first stitched image, and saving the first stitched image in the nonvolatile memory.

15 Claims, 5 Drawing Sheets

U.S. PATENT DOCUMENTS

| | | | |
|---|---|---|---|
| 7,085,435 B2* | 8/2006 | Takiguchi et al. | 382/294 |
| 2002/0006217 A1 | 1/2002 | Rubbert et al. | |
| 2002/0191865 A1* | 12/2002 | Yamaguchi et al. | 382/297 |

OTHER PUBLICATIONS

Yang Linhong et al, "A Stitching Algorithm Of Still Pictures With Camera Translation," Proceedings First International Symposium on Cyber Worlds IEEE Comput. Soc. Los Alamitos, CA, USA, 2002, pp. 176-182.

Chia-Yen Chen et al, "Image Stitching—Comparison and New Techniques," Computer Analysis of Images and Patterns. 8th International Conference, CAIP '99. Proceedings (Lecture Notes in Computer Science vol. 1689) Springer-Verlag Berlin, Germany, 1999, pp. 615-622.

Dae-Hyun Kim et al, "An Efficient Method To Build Panoramic Image Mosaics," Pattern Recognition Letters, vol. 24, No. 14, Oct. 2003, pp. 2421-2429.

PCT International Search Report, pp. 1-4.

PCT Written Opinion of The International Searching Authority, pp. 1-5.

Satya Prakash Mallick, "Feature Based Image Mosaicing", Department of Electrical and Computer Engineering, University of California, San Diego, paper, 6 pages.

U.S. Appl. No. 09/665,917, filed Sep. 20, 2000, entitled: "Image Matching Using Resolution Pyramids with Geometric Constraints", 45 pages.

U.S. Appl. No. 10/230,786, filed Aug. 29, 2003, entitled: "Image Warping Correction In Forming 360 Degree Panoramic Images", 21 pages.

Correlation (ESSI-CNES-INRIA report Bernard Holtz 1991) (2 pgs.).

Les Kitchen et al., "Gray-Level corner detection," Pattern Recognition Letters 1 (1982) 95-102.

International Preliminary Report on Patentability (Chapter 1 of the PCT), including Written Opinion of the International Searching Authority, 7 pages.

\* cited by examiner

PANORAMIC MAKER ENGINE FOR A LOW PROFILE SYSTEM

FIELD OF INVENTION

This invention relates to software for making a panoramic image on a low profile system.

DESCRIPTION OF RELATED ART

Digital photography is becoming more popular today as digital cameras and scanners are becoming widely available. Digital images can be created either by capturing a scene using a digital camera or digitizing a traditional film-based photograph using a scanner. One particular advantage of digital photography over traditional film-based photography is that digital images can be easily manipulated or edited for better presentation.

When a photographer captures a scene using a camera, the desired field of view may be larger than the normal field of view of the camera. Digital photography allows a panoramic image to be produced without the need of purchasing special equipment such as a panoramic camera or a fisheye lens. For example, a photographer with a digital camera may capture a series of digital pictures of a scene by rotating the camera and taking pictures in a sequence of different directions. The captured images may then be projected onto a cylinder and then stitched together to produce a panoramic picture of the scene. Similarly, film-based photographs can be digitized, and the panoramic picture can be composed by projecting and stitching together the digitized images. Presently, digital image programs are available for stitching multiple digital images together to form a panoramic picture. Exemplary programs include Ulead Cool 360™, Live Picture PhotoVista™, and MGI PhotoSuite III™.

Typically a digital image program is executed by a personal computer, which has sufficient processor power and memory to buffer and manipulate the series of pictures to be stitched into the panoramic picture. Typically the resulting panoramic picture is saved as a JPEG image. The JPEG image is saved horizontally scan line by scan line and thus spans the width of the entire series of pictures. Thus, the personal computer must buffer the entire series of pictures, decide how to stitch them, and then write the resulting panoramic picture horizontally scan line by scan line.

As cellular phones and handhelds (e.g., a Palm devices) with built-in cameras become increasing popular, these devices can be expected to create panoramic pictures despite their slow processors and limited memories. Similarly, digital cameras can be expected to perform panoramic functions. Thus, what is needed is panoramic software for portable devices that efficiently utilizes their limited resources.

BRIEF DESCRIPTION OF THE DRAWINGS

Use of the same reference numbers in different figures indicates similar or identical elements.

SUMMARY

In one embodiment of the invention, a method for generating a panoramic image includes receiving a first image, dividing the first image into a first portion and a second portion, rotating the first portion of the first image, saving the rotated first portion of the first image in a nonvolatile memory, receiving a second image, dividing the second image into a third portion and a fourth portion, matching an overlapping region between the second portion of the first image and the third portion of the second image, stitching the second portion of the first image and the third portion of the second image to form a first stitched image, rotating the first stitched image, and saving the first stitched image in the nonvolatile memory.

DETAILED DESCRIPTION

Method for Creating a Panoramic Image

Figure 1:
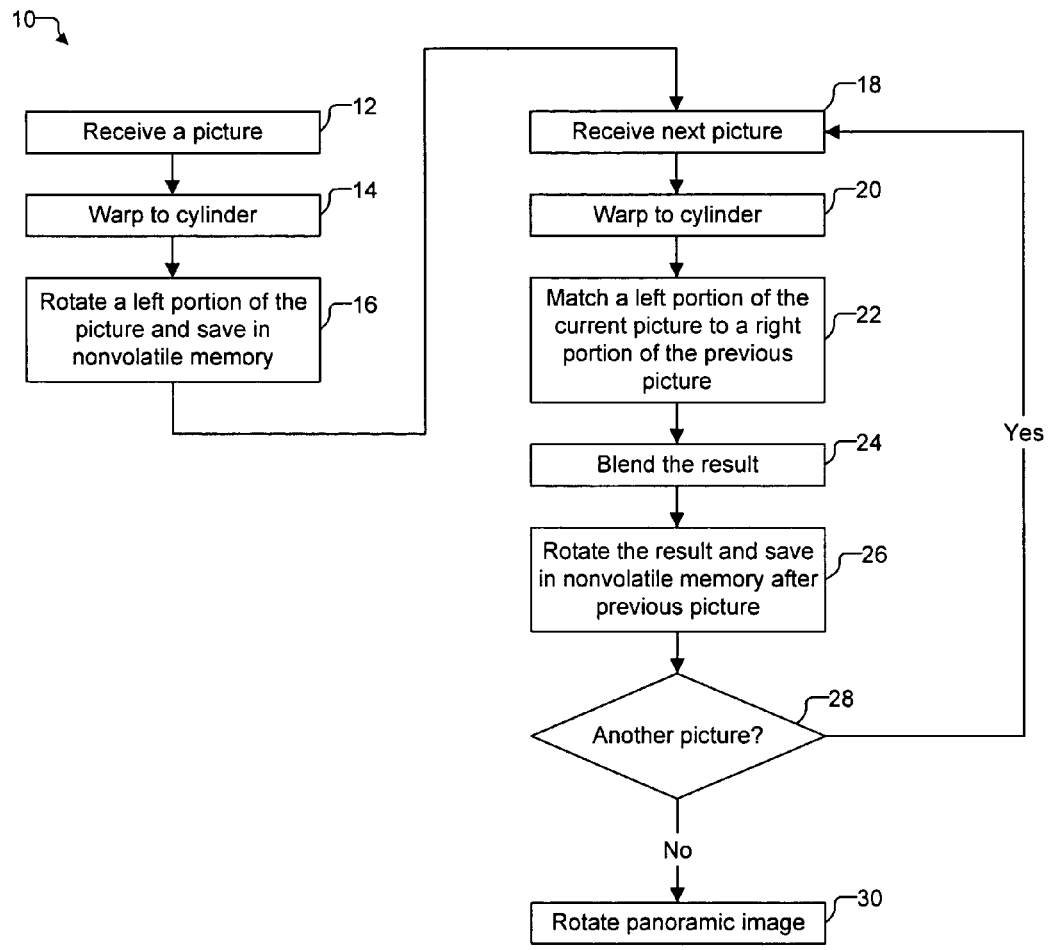
FIG. 1 is a flowchart of a method for creating a panoramic image in one embodiment of the invention.

FIG. 1 is a flowchart of a method 10 for creating a panoramic image in one embodiment of the invention. Method 10 can be implemented with software executed by hardware on a portable device such as a camera phone, a handheld device, or a digital camera.

Figure 2:
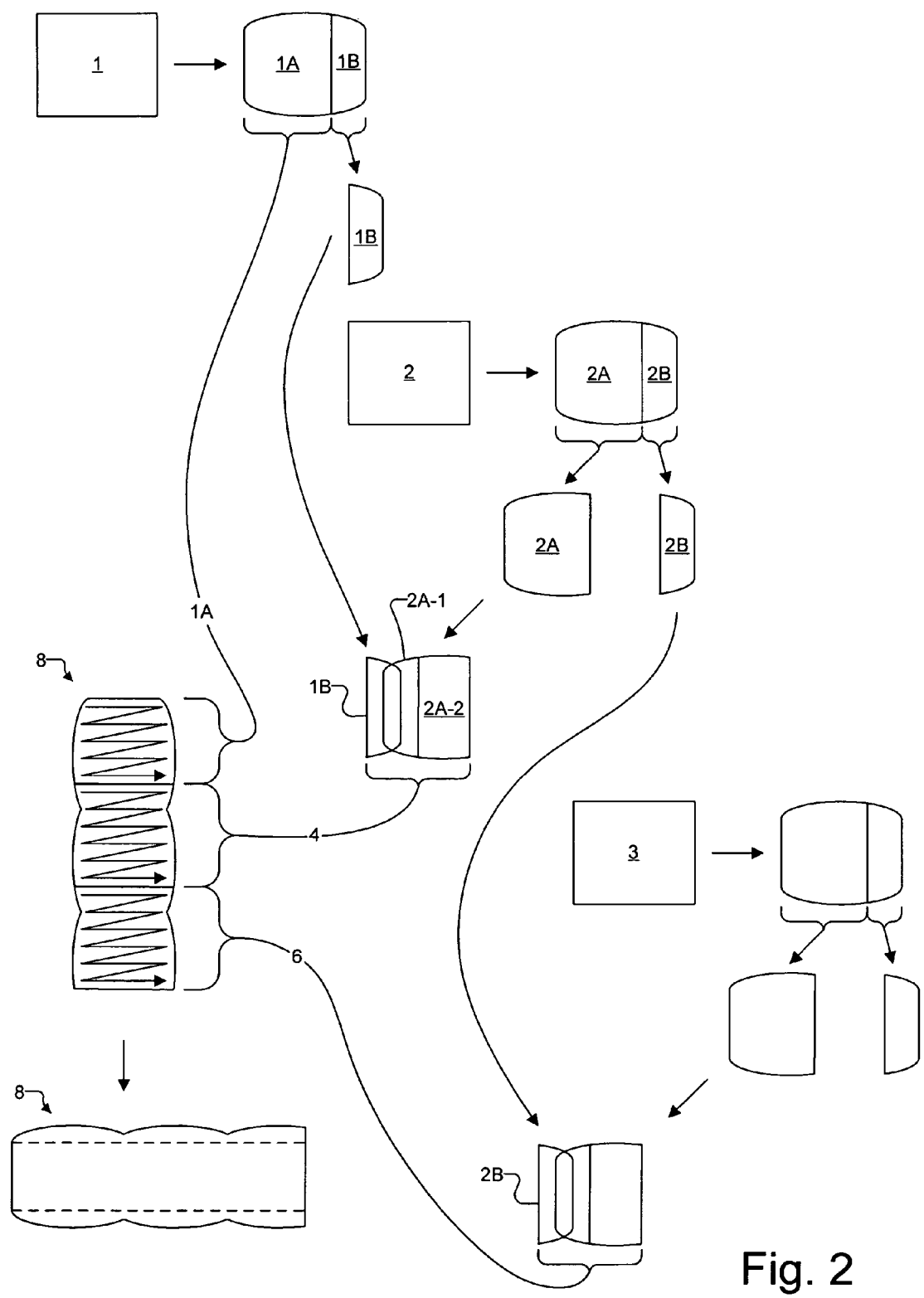
FIG. 2 illustrates the creation of a panoramic image using the method of FIG. 1 in one embodiment of the invention.

In step 12, the device receives or captures an image (e.g., image 1 in FIG. 2) in a series of images that makes up a panoramic image (e.g., panoramic image 8 in FIG. 2).

In step 14, the device projects the current image (e.g., image 1) onto a cylinder to generate a warped image. The warped image presents a realistic panoramic view to the user by placing the user at the center of the cylinder with the series of images projected onto the wall of the cylinder.

In step 16, the device divides the current image (e.g., image 1) into a left portion (e.g., left portion 1A in FIG. 2) and a right portion (e.g., right portion 1B in FIG. 2). The device then orthogonally rotates the left portion of the current image (e.g., left portion 1A of image 1) in a first direction (e.g., clockwise), and saves the rotated left portion as the first part of the panoramic image (e.g., panoramic image 8) in nonvolatile memory. In one embodiment, the panoramic image is saved in JPEG format so the rotated left portion is processed and saved horizontally scan line by scan line. The right portion of the current image (e.g., right portion 1B in image 1) is not yet rotated because it will be used to determine an overlap between the current image and the next image.

In step 18, the device receives or captures the next image (e.g., image 2 in FIG. 2) in the series of images that makes up the panoramic image (e.g., panoramic image 8). In one embodiment, the viewfinder of the device displays the right portion of the previous image (e.g., right portion 1B of image 1) so the user would know what portion of the scene should be included in the next image (e.g., image 2) to form the panoramic image.

In step 20, the device projects the current image (e.g., image 2) onto the cylinder to generate another warped image.

In step 22, the device divides the current image (e.g., image 2) into a left portion (e.g., left portion 2A in FIG. 2) and a right portion (e.g., right portion 2B in FIG. 2). The device then matches the right portion of the previous image (e.g., right portion 1B of image 1) with the left portion of the current image (e.g., left portion 2A of image 2) to determine the overlap between the previous image and the current image. In one embodiment, the device only searches a sub-portion of the left portion of the current image (e.g., sub-portion 2A-1 of image 2 in FIG. 2) for a match with the right portion of the previous image (e.g., right portion 1B of image 1). Once a match is found, the device aligns and then stitches together the right portion of the previous image and the left portion of the current image to form a stitched image (e.g., stitched image 4 in FIG. 2).

In step 24, the device blends the colors from the right portion of the previous image (e.g., right portion 1B of image 1) and the left portion of the current image (e.g., left portion 2A of image 2) to provide a smooth transition from the previous image to the current image.

In step 26, the device orthogonally rotates the stitched image in the first direction and then saves the rotated stitched image as a part of the panoramic image (e.g., panoramic image 8) in nonvolatile memory. As described above, in one embodiment, the panoramic image is saved in JPEG format so the rotated stitched image is processed and saved horizontally scan line by scan line. The right portion of the current image (e.g., right portion 2B of image 2) is not yet rotated because it will be used to determine the overlapping region between the current image (e.g., image 2) and the next image (e.g., image 3 in FIG. 2).

In step 28, the device determines if there is another image in the series of images that makes up the panoramic image. If so, step 28 is followed by step 18 and method 10 repeats until all the images in the series have been processed to form the panoramic image. If there is not another image in the series, then method 10 is followed by step 30.

In step 30, the device orthogonally rotates the panoramic image (e.g., panoramic image 8) in a second direction (counterclockwise) so the panoramic image is now in the correct orientation for viewing by the user. The device can also crop out the curvature in the panoramic image to make the final image rectangular. The device then saves the final panoramic image in nonvolatile memory.

Projecting an Image onto a Cylinder

Figure 3:
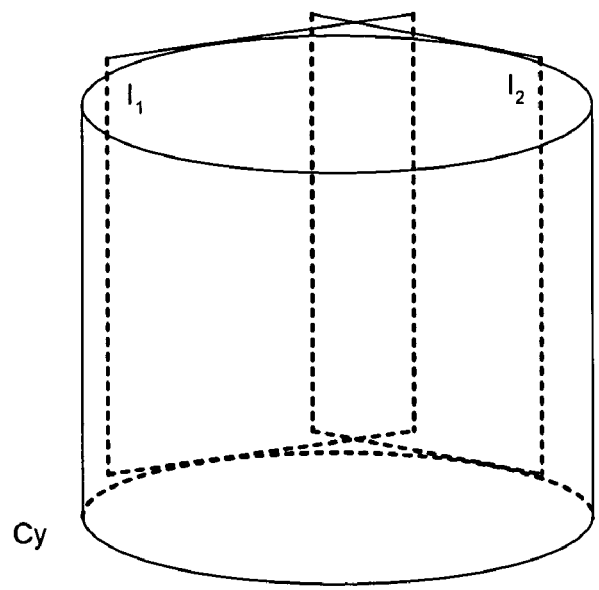
FIGS. 3 and 4 illustrate the projection of an image onto a cylinder for creating a panoramic image in one embodiment of the invention.

As described above in steps 14 and 20 (FIG. 2), the device projects the images that make up the panoramic image onto a cylinder as exemplified by images $I_1$ and $I_2$ in FIG. 3. This creates a realistic panoramic view to the user as if the user is standing at the center of the scene and viewing the surrounding when the user is actually viewing the series of images projected onto the wall of the cylinder.

To project the images on the cylinder, several assumptions are made. First, the focal length of the camera is assumed to be fixed and known. For example, the focal length of the camera can be provided by the device manufacturer. Second, the camera is assumed to have no other motion other than rotation around while taking the series of images. Third, the rotational axis is assumed to be parallel to the y-axis of image. To simply the projection model shown in FIG. 3, it is assumed that the focal length of the camera is f, the radius of cylinder is f, and the distances from the rotational axis to the image planes are also f.

Figure 4:
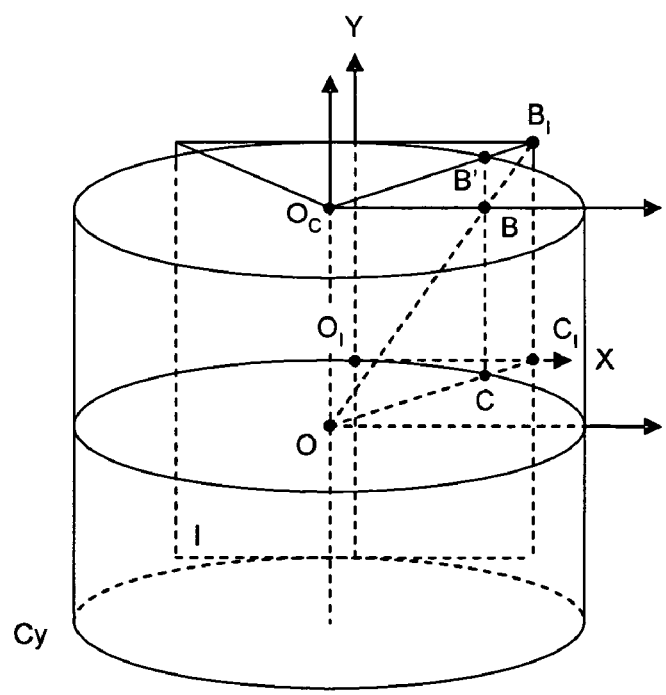

Referring to FIG. 4, plane I is the image plane and cylinder Cy is the cylinder where the images are to be projected. Origin $O_I$ is located at the center of image plane I and origin O is located at the center of cylinder Cy. Point $C_I$ lies on the x-axis of image plane I and point C is located at the intersection of line $OC_I$ and cylinder Cy. From trigonometry, the following correlation is inferred:

$$\frac{O_I C}{OO_I} = \arctan \frac{O_I C_I}{OO_I} \qquad (1)$$

Point $B_I$ is an arbitrary point in image plane I. Point $C_I$ is the projection of point $B_I$ onto the x-axis on image plane I. Line B'C is the projection of line $B_I C_I$ onto cylinder Cy and point B is the projection of point $B_I$ onto cylinder Cy. Here $\triangle OBC$ is similar to $\triangle OB_I C_I$. From trigonometry, the following correlation is inferred:

$$\frac{BC}{OC} = \frac{B_I C_I}{OC_I} = \frac{B_I C_I}{OO_I / \cos \frac{O_I C}{O_I O}} \qquad (2)$$

Suppose the image coordinates of point $B_I$ is (x, y) and the cylinder coordinates of B is (x', y'), equation 2 can be rewritten as:

$$x = f \tan \frac{x'}{f}, \text{ or } x' = f \arctan \frac{x}{f}, \text{ and} \qquad (3)$$

$$y = y' \cos \frac{x'}{f}, \text{ or } y' = y \sec \frac{x'}{f}. \qquad (4)$$

Thus, equations 3 and 4 are used to project the images that make up the panoramic image onto cylinder Cy. From equations 3 and 4, it can be seen that the relationship between y and y' is linear if x' or x is fixed and the formula for x' is independent of y. Thus, the calculation of x' and y' has been separated to reduce the complexity of the projection computation.

For example, one vertical line having value x in the image plane corresponds to one projected vertical line having value x' on the cylinder. Thus, value x' only needs to be determined once for projecting one vertical line having value x' in the image plane. As x' is constant, y' values for each vertical line on the cylinder can be calculated simply as a function of y because $$\sec \frac{x'}{f}$$

is constant in equation 4. Values of $$\arctan \frac{x}{f} \text{ and } \sec \frac{x'}{f}$$

can be stored in a lookup table instead of being calculated in real time to speed up the projection computation.

Matching Current and Previous Images

As described above in step 22 (FIG. 1), the device must match the current image and the previous image in order to align and stitch the images together to form a panoramic image. This can be done by placing one image over the other and determining how closely the two images match. As described above, the overlapping region to be matched and searched can be limited to a portion of the total image area, such as left portion 1B of image 1 (FIG. 2) and sub-portion 2A-1 of image 2 (FIG. 2), to speed up the matching process and to reduce the computing cost. In one embodiment, the device searches for shared features between the two images and uses these shared features to align the images. Typical features used for matching includes points, lines, and region topology. In one embodiment, the device uses a conventional RANSAC (Random Sample Consensus) algorithm to match the shared features between the two images.

Figure 5:
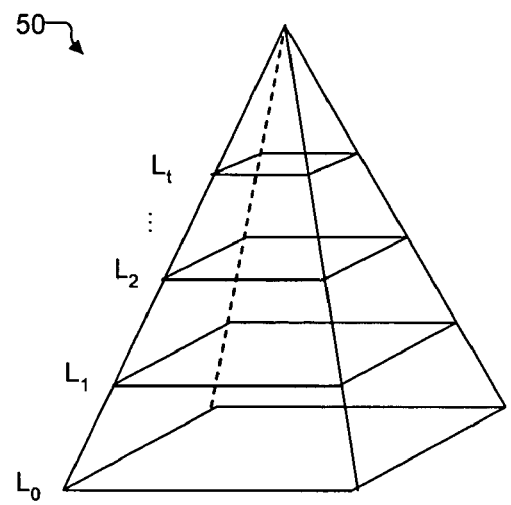
FIG. 5 illustrates a resolution pyramid used for matching two images in one embodiment of the invention.

To further speed up the matching process and reduce the computing cost, the device utilizes a resolution pyramid in one embodiment of the invention. The use of the resolution pyramid is described in commonly owned U.S. patent application Ser. No. 09/665,917, entitled "Image Matching Using Resolution Pyramids with Geometric Constraints," filed Sep. 20, 2001, which is incorporated by reference in its entirety. The use of the resolution pyramid is briefly described in reference to FIG. 5.

A resolution pyramid 50 can be constructed for each image to be matched. Resolution pyramid 50 includes n levels of the image at different resolutions, which range from the original resolution at level $L_0$ to the coarsest resolution at level $L_t$. In one embodiment, each upper level is derived from a lower level down sampled 2 by 2 pixels to 1 pixel.

At the top level, the image is small enough that matching two images can be accomplished relatively easily. For example, the device detects and matches features in the two images, or portions of the two images, at the top level to determine a camera motion. The device then uses the camera motion to guide the search at the next lower level. For example, the device first detects features in the previous image (or a portion of the previous image) at the next lower level. Instead of performing an exhaustive search of the current image (or a portion of the current image) for the shared features, the device searches areas of the current image (or a portion of the current image) where the camera motion predicts the shares features should be located. After searching and matching the shared feature, the device determines a refined camera motion that can be used again to further match the two images.

Blending the Overlapping Region

As described above in step 24 (FIG. 1), the overlapping region between two stitched images are blended to provide a smooth transition between images. In practice, the scene being captured often changes between the time when the device receives or captures the two images. This causes the content of the overlapped region between the two images to be less than identical. For example, if a man is walking in the scene, then the position of this man is different in these two images to be blended. A conventional blending method will result in a blurry panoramic image because the color values of the man would be blended into the image.

Figure 6:
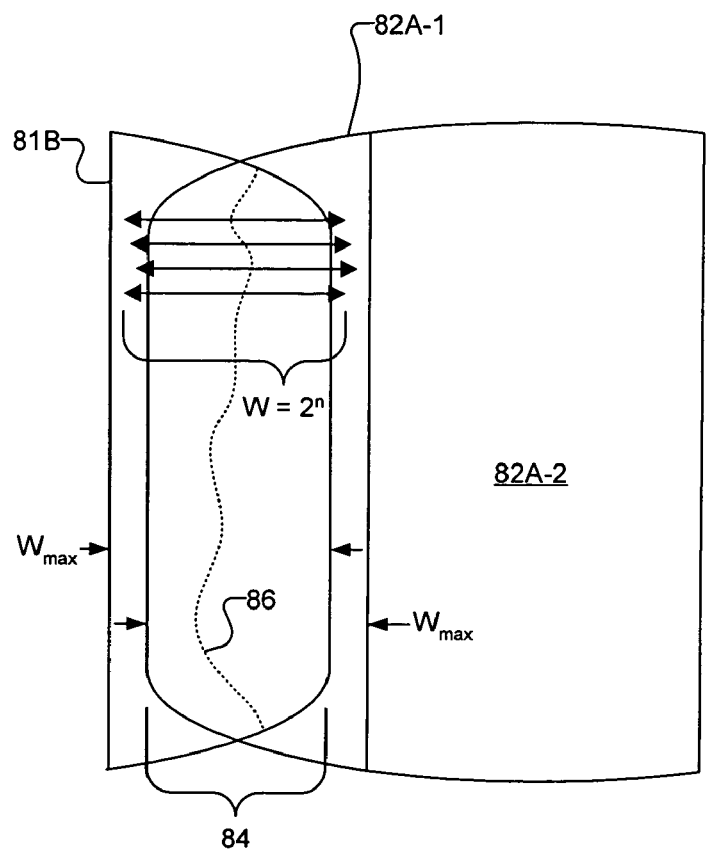
FIG. 6 illustrates a minimum color difference path in an overlapping region between two images in one embodiment of the invention.

FIG. 6 illustrates how the device prevents blurring in one embodiment of the invention. The device matches an overlapping region 84 between a right portion 81B of a previous image and a left portion of 82A-1 of the current image. To prevent blurring, the device first determines a color difference map of overlapping region 84 between the previous image and the current image. The device then determines a path 86 that has the minimum color difference in overlapping region 84. In one embodiment, a weighted color difference of a pixel is calculated as:

$$D_{ij} = d_{ij} + d_{i-2,j-1} + d_{i-1,j-1} + d_{i,j-1} + d_{i+1,j-1} + d_{i+2,j-1}, \quad (5)$$

where $D_{ij}$ is the weighted color difference of a pixel (i,j), $d_{ij}$ is the color difference of pixel (i,j) from the color difference map, and $d_{i-2,j-1}$, $d_{i-1,j-1}$, $d_{i,j-1}$, $d_{i+1,j-1}$, and $d_{i+2,j-1}$ are the color differences of the five lower neighbors of pixel (i,j) from the color difference map. Minimum color difference path 86 is the path that has the minimum color difference sum of all the pixels that make up the path out of all the possible paths through overlapping region 84.

The device stitches the previous image and the current image by filling the left of minimum color difference path 86 with the previous image, and filling the right of minimum color difference path 86 with the current image. If the colors of a scan line on the two sides of path 86 are similar, then the device blends the color values of the two images along a blending width W centered on path 86. The colors of a scan line on the two sides of path 86 are similar if the color difference of the pixel on path 86 in that scan line is less than a threshold value. If the colors of a scan line on the two sides of path 86 are too different, then the device does not blend the color values of the two images. Thus, the device prevents blurring by detecting a possible change in the scene and stops the blending of the two images.

Figure 7:
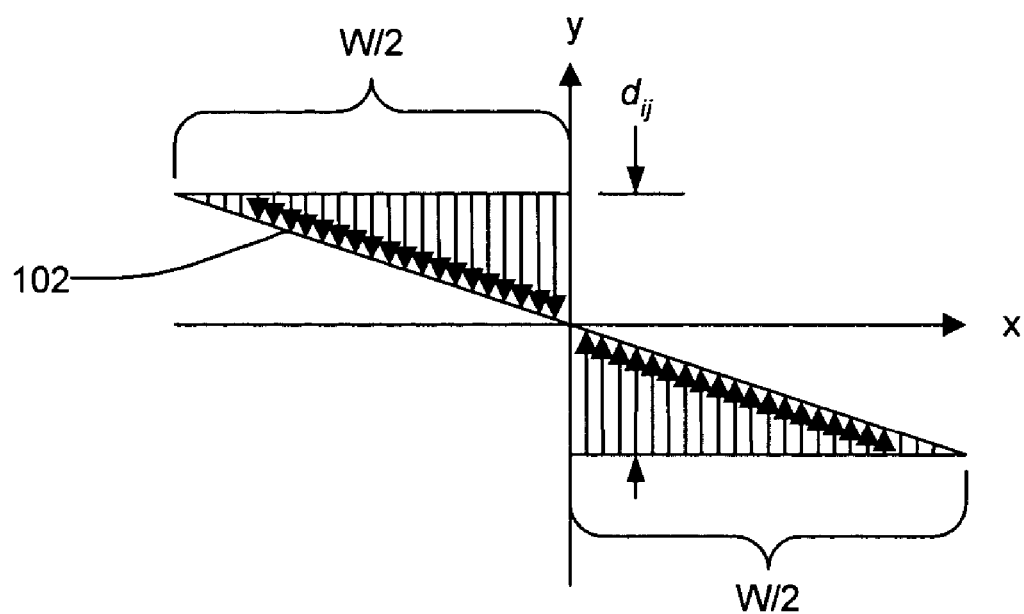
FIG. 7 illustrates a blending operation to smooth the transition between two images in the panoramic image in one embodiment of the invention.

FIG. 7 illustrates how the device blends the colors of the two images on a scan line in one embodiment of the invention. As illustrated in FIG. 7, the color value of the previous (e.g., left) image on path 86 is greater than the current (e.g., right) image on path 86 for a particular scan line. Thus, color values are subtracted from the previous image along half of blending width W (i.e., W/2) while color values are added to the current image along blending width W/2 to provide a smooth transition between the two images along path 86. Conversely, if the color value of the previous image on path 86 is less than the color value of the current image on path 86 for a particular scan line, then color values are added to the previous image along blending width W/2 and color values are subtracted from the current image along blending width W/2.

First, the device determines color values that are to be added to or subtracted from the color values of the previous image and the current image along blending width W. The color value to be added or subtracted is the product of a curve 102 and the color difference $d_{ij}$ of the pixel on path 86. Specifically, the device uses the following formula:

$$C(x) = \frac{d_{ij}}{2} \times \left(1 - \frac{x}{W/2}\right), \quad (6)$$

where C(x) is the color value to be added to or subtracted from a pixel located x away from pixel (i,j) on path 86, $d_{ij}$ is the color difference of pixel (ij), $$\left(1 - \frac{x}{W/2}\right)$$

represents curve 102, and W is the blending width.

In one embodiment, to speed up the blending operation, the device defines blending width W to be the largest integer of $2^n$ that is less than width $W_{max}$ of portion 81B and 82A-1 (FIG. 6). By defining blending width W so, the device can use shift operation in equation 6 instead of integral dividing to blend the color of the two images.

Various other adaptations and combinations of features of the embodiments disclosed are within the scope of the invention. Numerous embodiments are encompassed by the following claims.

What is claimed is:

1. A method for generating a panoramic image, comprising:
receiving a first image;
dividing the first image into a first portion and a second portion;
orthogonally rotating the first portion of the first image;
saving the rotated first portion of the first image as part of the panoramic image in a nonvolatile memory;
receiving a second image;
dividing the second image into a third portion and a fourth portion;
matching an overlapping region between the second portion of the first image and the third portion of the second image;
stitching the second portion of the first image and the third portion of the second image to form a first stitched image;
orthogonally rotating the first stitched image;
saving the first stitched image as part of the panoramic image in the nonvolatile memory; and
orthogonally rotating the panoramic image back to an original orientation of the first and the second images and saving the panoramic image in the nonvolatile memory.

2. The method of claim 1, further comprising:
after said receiving a first image and prior to said dividing the first image, projecting the first image onto a cylinder to warp the first image; and
after said receiving a second image and prior to said dividing the second image, projecting the second image onto the cylinder to warp the second image.

3. A method for generating a panoramic image, comprising:
receiving a first image;
projecting the first image onto a cylinder to warp the first image;
dividing the first image into a first portion and a second portion;
rotating the first portion of the first image;
saving the rotated first portion of the first image in a nonvolatile memory;
receiving a second image;
projecting the second image onto the cylinder to warp the second image;
dividing the second image into a third portion and a fourth portion;
matching an overlapping region between the second portion of the first image and the third portion of the second image;
stitching the second portion of the first image and the third portion of the second image to form a first stitched image;
rotating the first stitched image; and
saving the first stitched image in the nonvolatile memory;
wherein said projecting the first image onto a cylinder and said projecting the second image onto the cylinder comprises calculating coordinates of points on the cylinder as follows:

$$x' = f \arctan \frac{x}{f}; \text{ and}$$

$$y' = y \sec \frac{x'}{f};$$

wherein x' and y' are the coordinates of each point on the cylinder, x and y are the coordinates of each points on the first image and the second image, and f is the focus length of the camera.

4. The method of claim 1, wherein said matching the second portion of the first image and the third portion of the second image comprises matching shared features between the second portion of the first image and a sub-portion of the third portion of the second image.

5. The method of claim 4, wherein said matching shared features between the second portion of the first image and a sub-portion of the third portion of the second image comprises:
generating a first level of the second portion of the first image at a first resolution;
generating a second level of the third portion of the second image at the first resolution;
selecting at least a first feature on the first level of the first image;
searching the second level of the second image for the first feature; and
matching the first feature between the first level of the first image and the second level of the second image to determine a first relative motion between the first image and the second image.

6. The method of claim 5, wherein said matching shared features between the second portion of the first image and a sub-portion of the third portion of the second image further comprises:
matching pixels in the second portion of the first image and the third portion of the second image based on the first relative motion between the first image and the second image.

7. The method of claim 5, wherein said matching shared features between the second portion of the first image and a sub-portion of the third portion of the second image further comprises:
generating a third level of the second portion of the first image at a second resolution that is greater than the first resolution;
generating a fourth level of the third portion of the second image at the second resolution;
selecting at least a second feature on the third level of the first image;
searching an area on the fourth level of the second image for the second feature, wherein the area is selected based on the first relative motion between the first image and the second image;
matching the second feature between the third level of the first image and the fourth level of the second image to determine a second relative motion between the first image and the second image; and
matching pixels in the second portion of the first image and the third portion of the second image based on the second relative motion between the first image and the second image.

8. A method for generating a panoramic image, comprising:
receiving a first image;
dividing the first image into a first portion and a second portion;

rotating the first portion of the first image;
saving the rotated first portion of the first image in a nonvolatile memory;
receiving a second image;
dividing the second image into a third portion and a fourth portion;
matching an overlapping region between the second portion of the first image and the third portion of the second image;
stitching the second portion of the first image and the third portion of the second image to form a first stitched image, comprising:
 determining a minimum color difference path in the overlapping region, comprising:
  determining a color difference map of the overlapping region; and
  determining a path that has a lowest sum of color differences of pixels from the color difference map;
 filling a first side of the minimum color difference path with color values from the first image; and
 filling a second side of the minimum color difference path with color values from the second image;
rotating the first stitched image; and
saving the first stitched image in the nonvolatile memory.

9. The method of claim 8, further comprising blending the overlapping region if a color difference between the first side and the second side of a scan line is less than a threshold, comprising:
 blending the color values of the first image and the second image along a blending width of the minimum color difference path.

10. The method of claim 9, wherein said blending the color values of the first image and the second image comprises:
 adjusting the color values of the first image and the second image along the blending width using a value $C(x)$ defined by:

$$C(x) = \frac{d_{ij}}{2} \times \left(1 - \frac{x}{W/2}\right),$$

where $C(x)$ is the color value to be added to or subtracted from a pixel located x away from pixel (i,j) on the minimum color difference path, $d_{ij}$ is the color difference of pixel (i,j), and W is the blending width.

11. The method of claim 10, wherein the value $C(x)$ is (1) added to the color values of the first image and subtracted from the second image or (2) subtracted from the color values of the first image and added to the second image.

12. The method of claim 10, wherein the width is the largest integer 2 n that is less than the width of the second portion of the first image and, division operations in calculating the parameter $C(x)$ comprises shift operations.

13. The method of claim 1, further comprising:
receiving a third image;
dividing the third image into a fifth portion and a sixth portion;
matching the fourth portion of the second image and the fifth portion of the third image;
stitching the fourth portion of the second image and the fifth portion of the third image to form a second stitched image;
rotating the second stitched image; and
saving the second stitched image as part of the panoramic image in the nonvolatile memory.

14. The method of claim 1, wherein said saving the rotated first portion of the first image, said saving the first stitched image, and said saving the panoramic image comprising saving in a JPEG format in the nonvolatile memory.

15. The method of claim 8, wherein said determining a path that has a lowest sum of color differences of pixels from the color difference map comprises using a weighted color difference for each pixel in the color difference map, the weighted color difference for each pixel being defined as a sum of pixel values of the pixel and its five lower neighbors from the color difference map.

* * * * *